March 18, 1924.  1,487,464
J. MORRISON
POLE TRAILER
Filed March 24, 1920   2 Sheets-Sheet 1
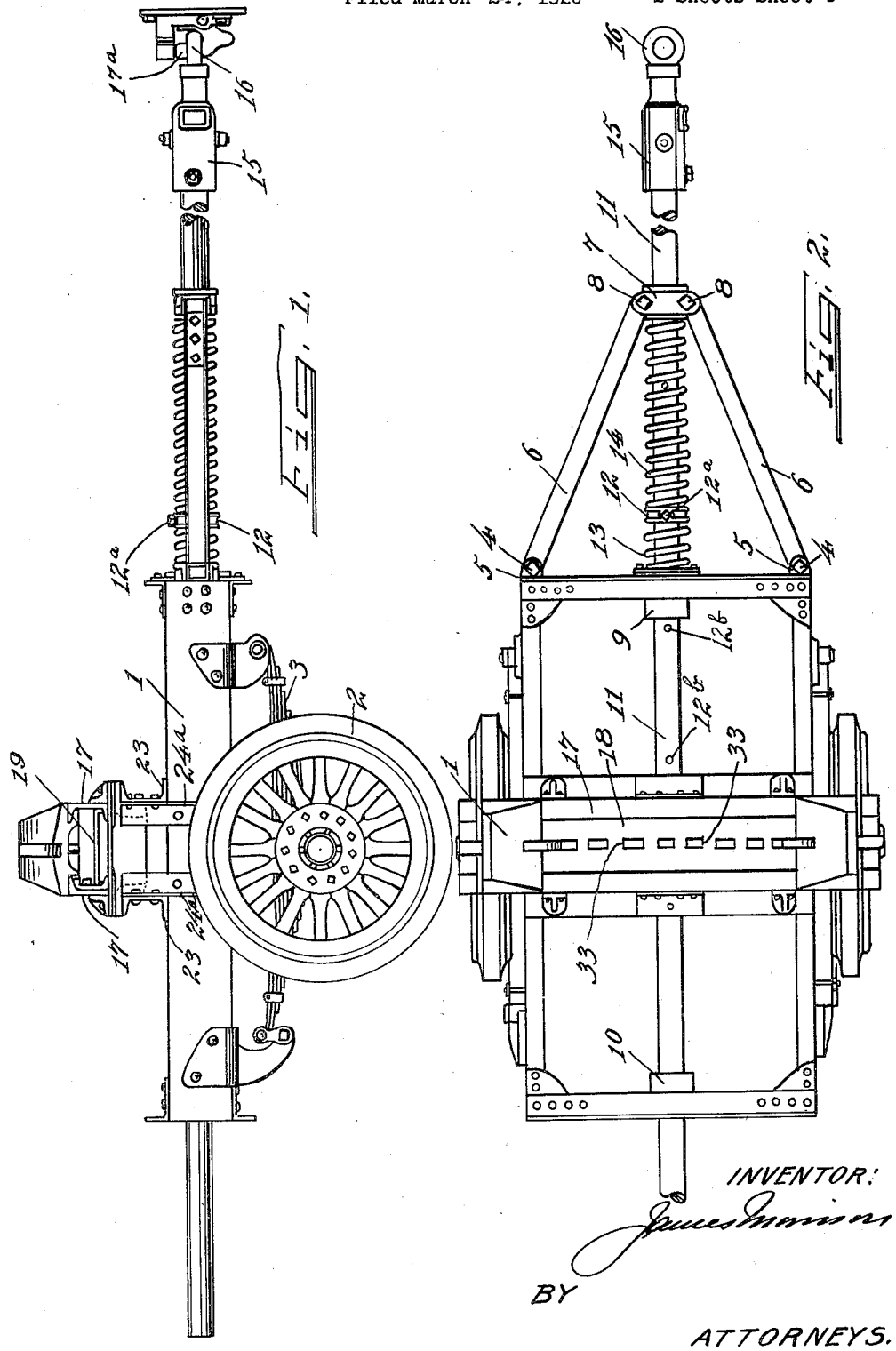
INVENTOR:
James Morrison.
BY
ATTORNEYS.

March 18, 1924.
J. MORRISON
POLE TRAILER
Filed March 24, 1920
1,487,464
2 Sheets-Sheet 2
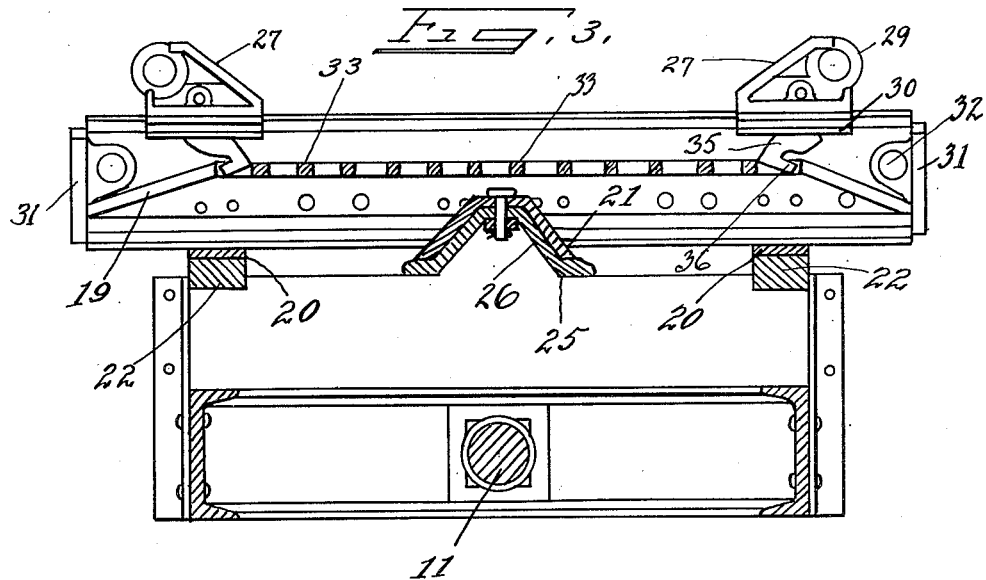
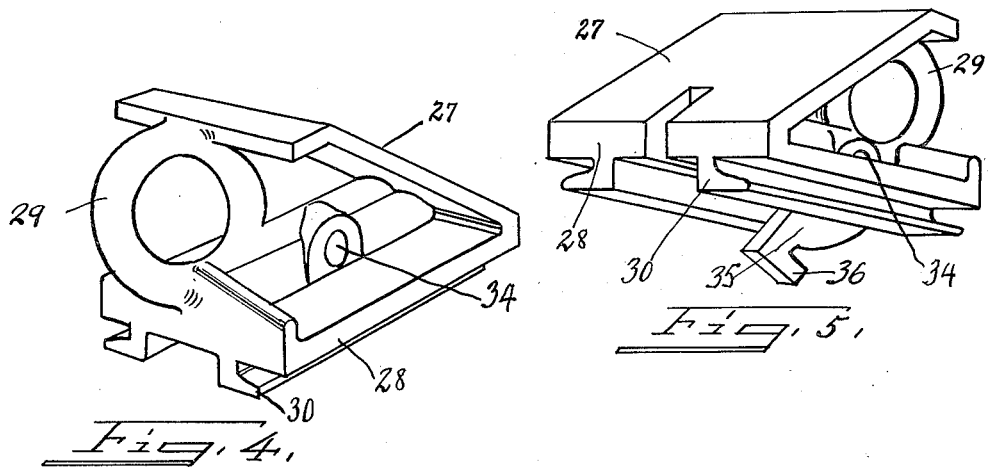
INVENTOR:
James Morrison
BY
ATTORNEYS.

Patented Mar. 18, 1924.

1,487,464

UNITED STATES PATENT OFFICE.

JAMES MORRISON, OF CINCINNATI, OHIO, ASSIGNOR TO THE TRAILMOBILE COMPANY, OF CINCINNATI, OHIO, A CORPORATION OF OHIO.

POLE TRAILER.

Application filed March 24, 1920. Serial No. 368,265.

*To all whom it may concern:*

Be it known that I, JAMES MORRISON, a citizen of the United States, and resident of the city of Cincinnati, in the county of Hamilton and State of Ohio, have invented certain new and useful Improvements in Pole Trailers, of which the following is a full, clear, and exact description, reference being had to the drawings forming a part of this specification.

My invention relates to pole trailers of the character wherein the tractor vehicle supports one end of a long load, the other end of which is supported on a trailer and in which the load forms a connection between the tractor and trailer that cannot change its dimensions.

In vehicles of this nature the bolsters or supports which bear the load directly must be pivoted on the tractor and trailer and the draft pole betwen the two vehicles must be of an extensible nature. The reason for this extensible characteristic in the draft pole is because the long load is supported on the trailer at a position behind the draft pole connection and on the tractor in a position ahead of the draft pole connection. When the vehicles are turning a corner the distance between the two supporting points of the load remain a constant distance apart thereby requiring the draft pole connections between the vehicles to permit its extension to avoid the trailer from being swung sidewise or overturned.

It is thus among the objects of my invention to provide a convenient form of a central pole for a trailer of this character.

The objects and other advantages to be noted I accomplish by that construction and arrangement of parts to be hereinafter more specificaly pointed out and claimed.

In the drawings,

Figure 1 is a side elevation of the trailer and pole constructed according to my invention.

Figure 2 is a top plan view of the parts shown in Figure 1.

Figure 3 is a vertical cross section of the trailer taken through the bolster thereon.

Figures 4 and 5 are perspective views of the adjustable load retaining block.

No tractor vehicle has been shown in the drawing, nor any bolster as mounted on a tractor because this was considered unnecessary in view of the fact that any form of tractor would serve the purpose and that the bolster on the tractor is of identically the same construction as that shown and described and mounted on the trailer.

The trailer has a frame 1 beneath which are mounted wheels 2 suspended by springs 3 in the usual manner. Mounted on vertical bolts 4 that are sustained by plates 5 at the two forward corners of the trailer frame are the bars 6, 6. A collar 7 is provided to which the bars 6 are connected by means of bolts 8.

It should be noted that this construction permits of flexibility and play in the triangular collar supporting frame, which is a very valuable feature in that it greatly increases the strength and life of the parts.

The frame is provided with journal boxes 9, 10 at the forward and rear ends thereof, through which journal boxes passes the long draft pole 11. This pole extends forwardly from the trailer and passes through the collar 7 which loosely engages it. A collar 12 is mounted adjustably on the pole by means of a pin or bolt $12^a$, which may be positioned as desired in various holes $12^b$ in the pole. As will be readily understood, the pole will be called upon for adjustment in proportion to the length of the load that is carried by the device and by adjusting the collar 12, this adjustment is provided.

Between the collar and the trailer frame is a short spiral spring 13 mounted over the pole and between the collar 12 and the loosely engaging collar or journal 7, is a much longer spiral spring 14.

From this construction it will be evident that the pole may be pulled a considerable distance forwardly through the trailer before the spring 14 will be entirely compressed and that some resiliency is provided in the opposite direction.

The presence of the springs around the shaft itself is a secure and simple means of taking up the shock and, in connection with the adjustable collar, provides a ready means of lengthening and shortening the pulling length of the pole without affecting the spring take-up.

The forward end of the pole is equipped with a cap 15 at the end of which is a large eye 16. This eye or loop is secured over a protected post $17^a$ on the tractor which is of any desired construction and preferentially should be hinged so that it can be swung out of the way when necessary, although this forms no feature of the invention covered by this application. The bolster devices are made up of two heavy channel bars 17 which are connected by an inverted channel bar 18 which runs the full length of the bars 17 and is crocked or bent down at the end at 19. It may be observed that the space left between the channel bars 17 and the crocked down ends of the base bar 19, provides a pocket in which to insert a skid end, which will hold the bolster and skid together without slipping while a load is being mounted. Heavy bearing plates 20, 20 are secured across beneath the bolster bars adjacent the ends thereof and a fifth wheel or conical bearing plate 21 is secured centrally of said bolster bars.

Heavy blocks 22, 22 are secured in place beneath the bearing plate 20 by means of a frame mounted on the trailer frame proper, this frame comprising channel bars 23, 23, held in place by uprights 24ª, at each side of said trailer frame.

A conical pivot block 25 is secured in place by means of this additional frame and has a conical supporting surface 26, which is engaged by the conical bearing plate, 21, secured to the bolster. This construction provides a fifth wheel device for the bolster, so that it can turn with relation to the trailer frame, and in which all strains are distributed over the cones.

By my failure above to mention the various mechanical equivalents for the parts described, I do not wish thereby to imply any specific meaning to the terms used, which excludes the interpretation of them with the full benefit of the doctrine of equivalents.

Having thus described my invention, what I claim as new and desire to secure by Letters Patent, is:—

1. In a device of the character described, a trailer frame, a pole, journals at front and rear of the said frame for slidably mounting the pole, and a member mounted on the forward frame member of the trailer, and adapted to serve as a limit to the forward sliding motion of the pole, said member comprising a collar through which the pole passes, and frame elements connected to the frame of the trailer and said collar, for holding the collar in spaced relation to the trailer frame and a resilient element on the pole to contact with the collar.

2. In a device of the character described, a trailer frame, a pole, journals at front and rear of the said frame for slidably mounting the pole, and a member mounted on the forward frame member of the trailer, and adapted to serve as a limit to the forward sliding motion of the pole, with the mounting means for the said member on the forward trailer frame being articulated therewith, for the purpose described.

JAMES MORRISON.